United States Patent
Anzel et al.

[19]

[11] Patent Number: 6,015,116
[45] Date of Patent: Jan. 18, 2000

[54] FUEL EFFICIENT METHODS FOR SATELLITE STATIONKEEPING AND MOMENTUM DUMPING

[75] Inventors: Bernard M. Anzel, El Segundo; Yiu-Hung M. Ho, Palos Verdes Estates; Richard A. Noyola, Torrance, all of Calif.

[73] Assignee: Hughes Electronics Corporation, El Segundo, Calif.

[21] Appl. No.: 08/989,184

[22] Filed: Dec. 11, 1997

[51] Int. Cl.[7] ...................................................... B64G 1/26
[52] U.S. Cl. ............................ 244/169; 244/164; 244/172
[58] Field of Search ............................... 244/169, 158 R, 244/164, 172, 170

[56] References Cited

U.S. PATENT DOCUMENTS

| | | | |
|---|---|---|---|
| 4,767,084 | 8/1988 | Cnan et al. | 244/164 |
| 5,443,231 | 8/1995 | Anzel . | |

FOREIGN PATENT DOCUMENTS

| | | |
|---|---|---|
| 0568209 | 11/1993 | European Pat. Off. . |
| 0780297 | 6/1997 | European Pat. Off. . |
| 0780299 | 6/1997 | European Pat. Off. . |
| WO87/00653A | 1/1987 | WIPO . |

OTHER PUBLICATIONS

US Patent Application 08/577,444, "Momentum Unloading Using Gibaled Thrusters", filed Dec. 22, 1995.
US Patent Application 08/841,211, "Stationkeeping and Momentum–Dumping Thrusters Systems and Methods", filed Apr. 29, 1997.

*Primary Examiner*—Charles T. Jordan
*Assistant Examiner*—Tien Dinh
*Attorney, Agent, or Firm*—Georgann S. Grunebach; M. W. Sales

[57] ABSTRACT

Satellite stationkeeping and momentum-dumping methods are facilitated by the use of diagonally-arranged thruster pairs which are positioned on a selected one of a nadir and an antinadir satellite face. A first one of the thruster pairs is directed so that its thruster forces are spaced by moment arms from the satellite's center of mass. Firings of this thruster pair are separated by a momentum-dumping right ascension difference that is chosen to enhance momentum authority. These firings generate momentum-dumping torques and contribute to stationkeeping velocity changes. A second one of the thruster pairs is directed so that its thruster forces substantially pass through the center of mass. Firings of this thruster pair are separated by a stationkeeping right ascension difference chosen to minimize fuel consumption while providing a major portion of stationkeeping velocity changes.

28 Claims, 8 Drawing Sheets

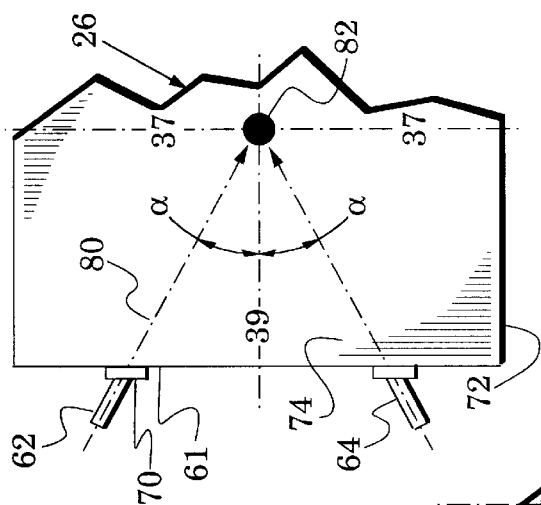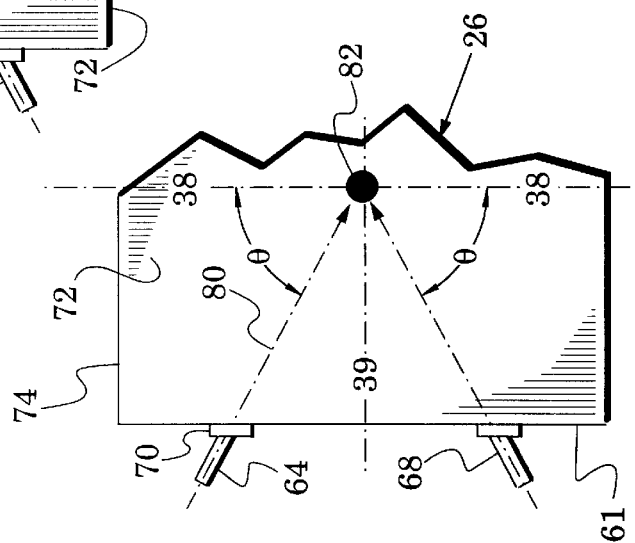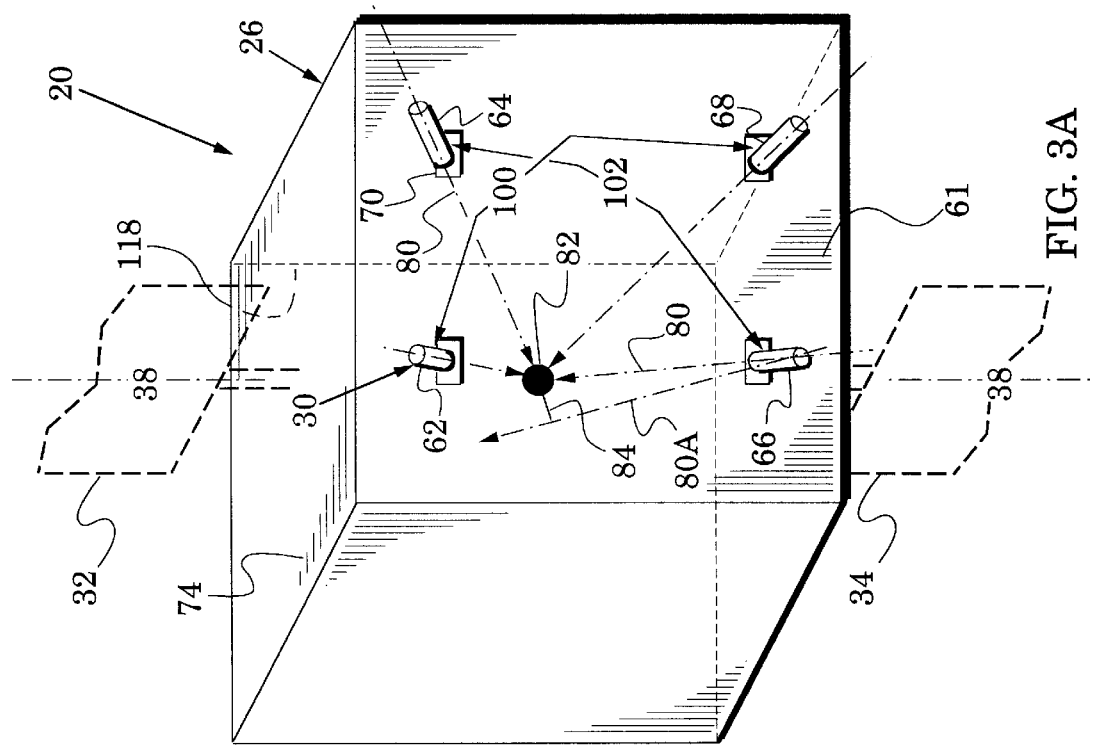

FUEL EFFICIENT METHODS FOR SATELLITE STATIONKEEPING AND MOMENTUM DUMPING

BACKGROUND OF THE INVENTION

1. Field of the Invention

The present invention relates generally to satellites and more particularly to satellite stationkeeping and momentum dumping.

2. Description of the Related Art

Satellites are placed in earth orbits to facilitate an ever-increasing number of operational functions (e.g., communications, weather monitoring and scientific observations). Accordingly, they are maintained in a variety of attitudes and placed in a variety of orbits (e.g., low earth orbits, transfer orbits, inclined synchronous orbits and geostationary orbits).

Synchronous satellites are typically required to remain within an assigned orbital station or "box" which has predetermined box dimensions (e.g., ~147 kilometers). The act of maintaining a synchronous satellite in its assigned station is typically referred to as stationkeeping and it requires careful control of the satellite's longitude, the eccentricity of its orbit and the inclination of its orbital plane from the Earth's equatorial plane.

Perturbations which act to disturb a satellite's position include solar radiation pressure, gravity gradients due to the positions of the moon and the sun and gravity gradients caused by the earth's "triaxiality". These orbital perturbations must be offset by inducing controlled velocity changes in the satellite (e.g., velocity changes normal to the satellite's orbit plane and velocity changes tangential and radial to the satellite's orbit path). The velocity changes are typically effected with thrusters.

Specific attitudes of body-stabilized satellites must also be maintained to facilitate their designed functions (e.g., orientation stability is necessary for the antennas of communication satellites). A variety of external sources (e.g., solar pressure, gravity gradients and magnetic fields) can generate attitude-disturbing torques in satellites. These disturbance torques are typically countered with correction torques that are generated by changing the angular velocity of reaction wheel rotors. Because reaction wheels have an angular velocity design limit, however, their stored momentum must be periodically "dumped" by applying momentum-dumping torques to the satellite. These torques are typically effected with thrusters that are directed so that their forces define a moment arm with the satellite's center of mass.

Various satellite thruster systems and methods have been proposed. For example, U.S. Pat. No. 4,767,084 provides twelve thrusters which are arranged about a satellite's periphery. Six thrusters generate positive and negative torque about each of three axes of the satellite's coordinate system and the other six are backup thrusters. Two thrusters are mounted on each of the satellite's north and south faces and four thrusters are mounted on each of the satellite's east and west faces.

Initially, thrusters are repetitively fired on a selected one of the satellite's east and west faces to reduce the satellite's east-west drift. In these initial firings, thrusters are selected which also generate torque that simultaneously desaturates the momentum wheels. After the east-west drift has been reduced, thrusters are fired alternately on the east and west faces to complete the desaturation of the momentum wheels without disturbing the previously-reduced east-west drift.

A simpler thruster system was described in U.S. Pat. No. 5,443,231 which issued Aug. 22, 1995 to Bernard Anzel and was assigned to Hughes Electronics, the assignee of the present invention. This system positioned four thrusters on a satellite's antinadir face with their thrust lines passing through the satellite's center of mass. The thrust lines of north and south thruster pairs form a cant angle $\theta$ with the satellite's north-south axis and the thrust lines of east and west thruster pairs form a slew angle $\alpha$ about the satellite's north-south axis. Therefore, each thruster can generate normal, tangential and radial velocity changes in the satellite so that the thruster system is especially suited for use in methods of stationkeeping and momentum dumping.

In an exemplary use of this thruster system, copending U.S. patent application Ser. No. 08/701,513 (entitled "Stationkeeping and Momentum-Dumping Thruster Systems and Methods", filed Aug. 22, 1996, and assigned to Hughes Electronics, the assignee of the present invention) teaches methods for stationkeeping in inclined orbits.

In another exemplary use of this thruster system, copending U.S. patent application Ser. No. 08/841,211 (entitled "Momentum Unloading Using Gimballed Thrusters", filed Apr. 29, 1997, and assigned to Hughes Electronics) teaches methods for east-west and north-south stationkeeping while simultaneously unloading satellite momentum. In a method embodiment, thrusters are fired on each side of ascending and descending nodes (the intersections of the satellite's orbit plane and the earth's equatorial plane).

Although methods of these references can achieve satellite stationkeeping and momentum dumping, they fail to address the role of thruster fuel efficiency in these activities. Fuel efficiency is critical to the economic viability of satellites because increased efficiency facilitates greater payloads and longer lifetimes.

SUMMARY OF THE INVENTION

The present invention is directed to fuel-efficient methods for satellite stationkeeping and momentum dumping.

These methods are initiated by positioning four thrusters in diagonally-arranged thruster pairs on a selected one of a nadir and an antinadir face of a satellite. Each thruster pair thus has a north and a south thruster. A first one of the thruster pairs is directed so that its thruster forces are spaced by moment arms from the satellite's center of mass and a second one of the thruster pairs is directed so that its thruster forces substantially pass through the center of mass.

Each of the first thruster pair is fired in an orbit region which is selected to generate momentum-dumping torques in the satellite while enhancing fuel efficiency. Each of the second thruster pair is fired in an orbit region which is selected to generate stationkeeping velocity changes in the satellite while also enhancing fuel efficiency.

In a method embodiment, a north thruster of the second thruster pair is fired in a first right ascension region and a south thruster of the second thruster pair is fired in a second right ascension region wherein the first and second right ascension regions differ by a stationkeeping right ascension difference that is chosen to enhance stationkeeping velocity changes. In this embodiment, a first thruster of the first thruster pair is fired in a selected one of the first and second right ascension regions and a second thruster of the first thruster pair is fired in a third right ascension region wherein the selected and third right ascension regions differ by a momentum-dumping right ascension difference that is chosen to enhance momentum-dumping torques.

In a method embodiment, the selected right ascension region is the first right ascension region and the first thruster is a north thruster. In another method embodiment, the selected right ascension region is the second right ascension region and the first thruster is a south thruster.

In an exemplary method embodiment, the first right ascension region is in a range of right ascension 90±30°, the stationkeeping right ascension difference is in a range of 180±30° and the momentum-dumping right ascension difference is in a range of 90±30°.

Fuel efficiency of the invention is enhanced because, 1) the first thruster pair firings are separated by a momentum-dumping right ascension difference that is chosen to enhance momentum authority, 2) the second thruster pair firings are separated by a stationkeeping right ascension difference chosen to enhance fuel efficiency while providing a major portion of stationkeeping velocity changes and 3) one of the momentum-dumping firings is positioned in the region of one of the stationkeeping firings so as to simultaneously contribute to stationkeeping and enhance fuel efficiency.

Other method embodiments choose velocity changes induced by each thruster of the first thruster pair to generate a net tangential velocity change in the satellite that is substantially zero. Thus, the first thruster pair generates substantially zero east-west stationkeeping velocity changes.

Failure-mode methods are also provided for failure situations in which only one of the first and second thruster pairs is functional.

The teachings of the invention can be practiced with a variety of thruster types (e.g., monopropellant, bipropellant and electrostatic). Because of their high specific impulse, ion thrusters are especially suited for enhancing the fuel efficiency of the methods.

The novel features of the invention are set forth with particularity in the appended claims. The invention will be best understood from the following description when read in conjunction with the accompanying drawings.

BRIEF DESCRIPTION OF THE DRAWINGS

FIG. 3A is an enlarged view of the body of the spacecraft of FIG. 1 which illustrates a thruster system of the present invention;

FIG. 3B is a view of the east face of the body of FIG. 3A;

FIG. 3C is a view of the north face of the body of FIG. 3A;

DETAILED DESCRIPTION OF THE PREFERRED EMBODIMENTS

The present invention provides fuel-efficient methods for satellite stationkeeping and momentum dumping. To further an understanding of these methods, their description is preceded by the following description of FIGS. 1–3.

Figure 1:
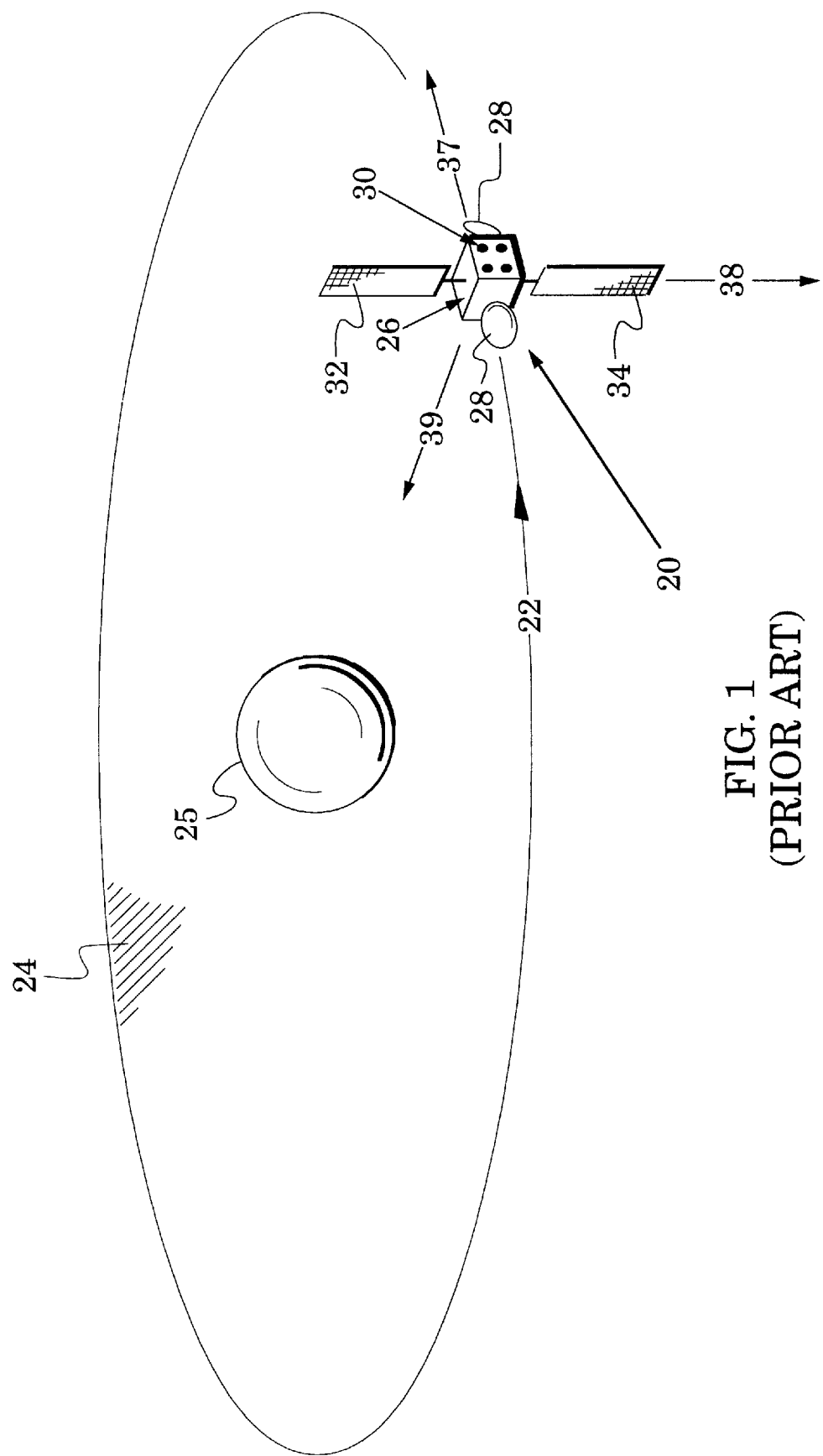
FIG. 1 is a perspective view of a satellite in an Earth orbit.

FIG. 1 illustrates an exemplary body-stabilized satellite 20 which travels along an orbit path 22 that defines an orbit plane 24 about the earth 25. Carried on or within the satellite's body 26 are various operational systems, e.g., a communications system which includes antennas 28, a propulsion system which includes a thruster system 30 and an energy-generation system which includes solar wings 32 and 34.

Satellite attitude can be defined with reference to a coordinate system 36 which has a roll axis 37, a pitch axis 38 and a yaw axis 39. The pitch axis 38 is orthogonal to the orbit plane 24, the yaw axis 39 is directed at the center of mass of the earth 25 and the roll axis is orthogonal to the other two axes. The solar wings are generally placed on opposite sides of the orbit plane 24 and rotated about the pitch axis 38 so that solar radiation of the planet's sun (not shown) is incident upon the wings' solar cells for generation of electrical energy.

Figure 2:
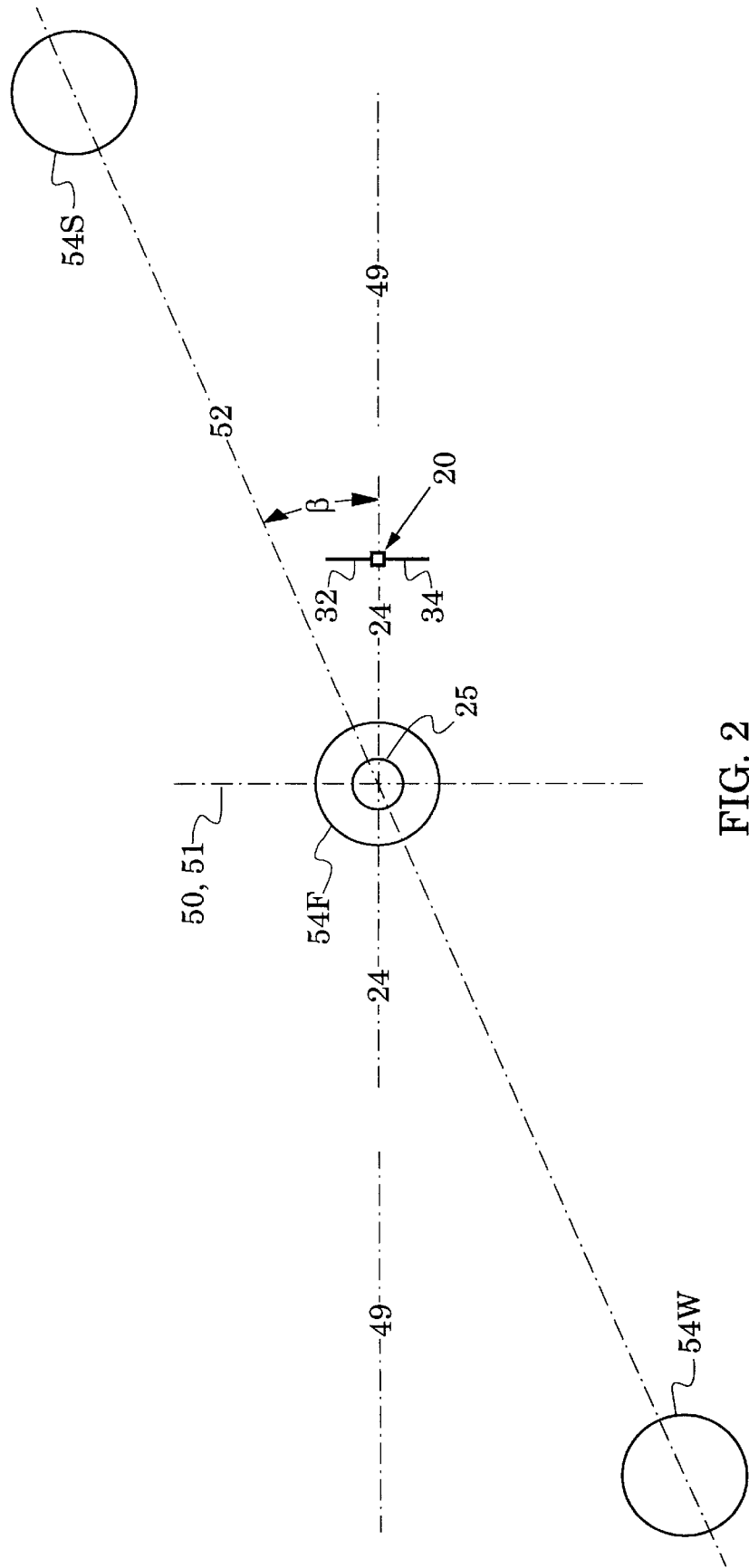
FIG. 2 is a side view of the satellite and orbit of FIG. 1.

FIG. 2 illustrates the satellite 20 in a geostationary orbit in which its orbit plane 24 is coplanar with the earth's equatorial plane 49. Thus, an orbit normal 50 and the earth's equatorial pole 51 are colinear. The sun appears to travel about the earth 25 along an ecliptic plane 52 which is tilted from the equatorial plane 49 by an inclination angle β (~23.45 degrees for the earth-sun system). The earth's sun 54 is shown as it would appear each season at summer solstice 54S, at fall equinox 54F and at winter solstice 54W.

The enlarged views of FIGS. 3A–3C show that the thruster system 30 is carried adjacent to an antinadir face 61 of the satellite 20 and has thrusters 62, 64, 66 and 68 which are respectively positioned in northwest, northeast, southwest and southeast regions of the antinadir face 61 and initially directed through the satellite's center of mass 60.

When viewed from an east body face 72 (in FIG. 3B), the north thrusters 62 and 64 and the south thrusters 66 and 68 are seen to be oppositely positioned from the satellite's pitch axis 38 by a cant angle θ. When viewed from a north body face 74 (in FIG. 3C), the west thrusters 62 and 66 and east thrusters 64 and 68 are oppositely positioned from the yaw axis 39 by a slew angle α.

In accordance with the present invention, each thruster is also coupled to the satellite body 26 by a gimbal system 70. Although its details are not shown, the gimbal system is any conventional rotational system (e.g., one having two orthogonally-arranged rotation axes or one based on a ball-and-socket structure) which permits redirection of the thrusters and their firing forces.

FIG. 3A shows the thrusters directed to have their thrust lines 80 passing through the satellite's center of mass 82. With the thrusters so directed, they can generate velocity changes in the satellite 20 which have components that are normal to the orbit plane (24 in FIG. 1) and tangential and radial to the orbit path (22 in FIG. 1). Because of their gimbals 70, the thrusters can also be directed so that their thrust lines, are spaced by moment arms from the center of mass 82. This is indicated by the exemplary thrust line 80A and moment arm 84. In the latter position, a thruster 66 directed to have a moment arm R and generating a force F can induce a torque T in the satellite 20 given by the vector equation of T=R×F (in which x represents a cross product). In addition, the thruster 66 can still generate normal, tangential and radial velocity changes in the satellite 20.

Figure 4:
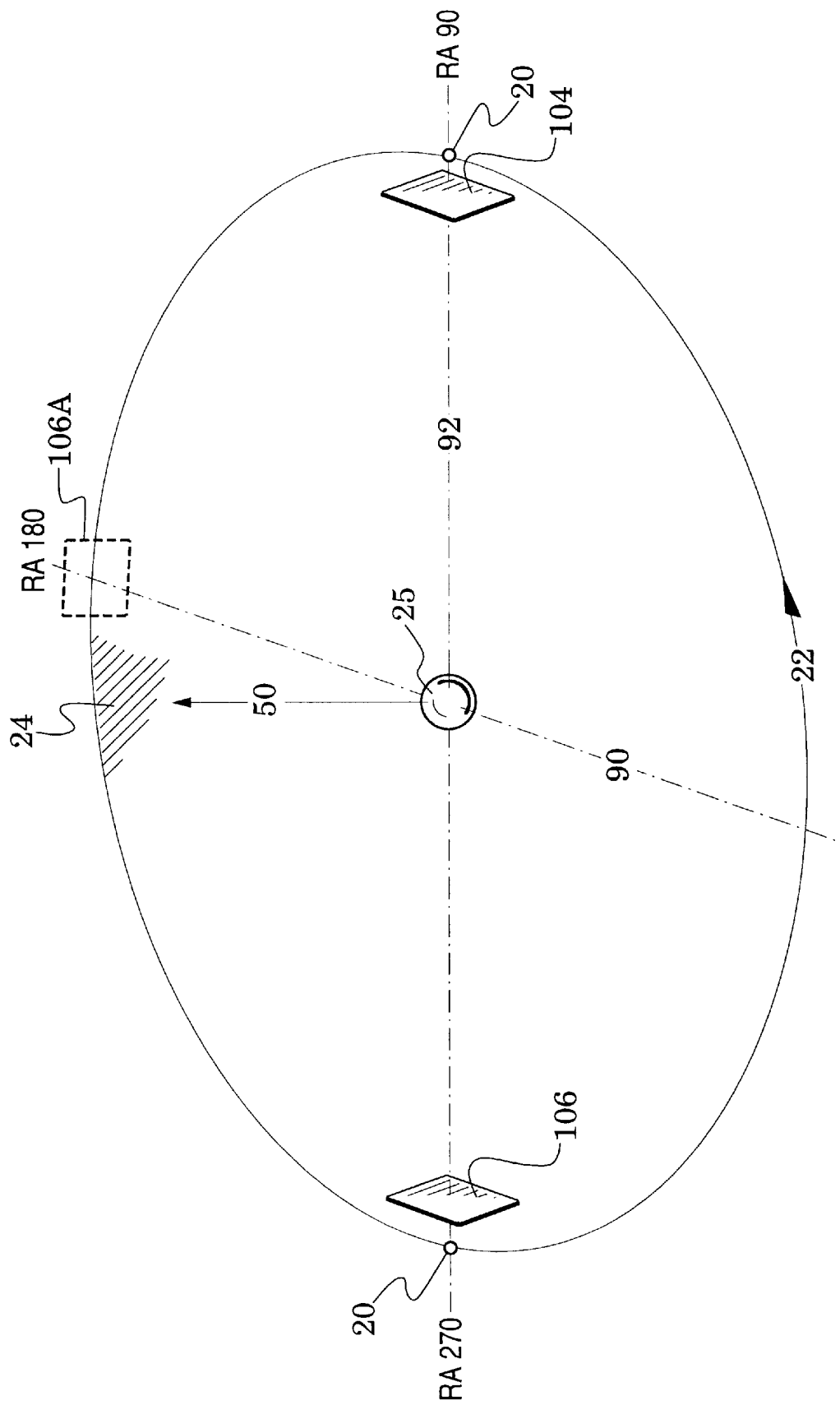
(FIG. 4 is an overview of an orbit plane of FIGS. 1 and 2.

FIG. 4 is an overview of the orbit plane 24 in which it is assumed that the orbit plane is substantially coplanar with the equatorial plane (49 in FIG. 2). In a geocentric equatorial coordinate system, an imaginary line 90 between right ascension 0° and right ascension 180° represents the intersection between the equatorial plane and the ecliptic plane (52 in FIG. 2). The sun is at right ascension 0° at vernal equinox, at right ascension 90° at summer solstice, at right ascension 180° at fall equinox and at right ascension 270° at winter solstice.

It is known that gravity gradients imposed on an earth satellite by the moon and the sun essentially exert a northward force on the satellite in the region of right ascension 90° and a southward force in the region of right ascension 270°. These forces cause the satellite's orbit normal 50 to precess in the general direction of right ascension 0°, i.e., these forces cause the orbit plane (24 in FIG. 2) to have an inclination error from the equatorial plane (49 in FIG. 2).

To enhance fuel efficiency, inclination error is preferably corrected by exerting a south-directed force on the satellite 20 in the region of right ascension 90° and a north-directed force in the region of right ascension 270°. An essential part of stationkeeping is therefore accomplished by applying normal (normal to the orbit plane 24 of FIG. 2) velocity changes to the satellite 20 in these regions.

Other principal stationkeeping errors are longitudinal drift and orbit eccentricity. Because tangential and radial velocity changes can produce both drift changes and orthogonal eccentricity changes, a stationkeeping method of the invention fires a north thruster in the region of right ascension 90° and a south thruster in the region of right ascension 270° and the normal, tangential and radial forces of these firings contribute to the control of stationkeeping errors, e.g., inclination, longitudinal error, longitudinal drift and orbit eccentricity. In accordance with the present invention, therefore, a nominal value for the stationkeeping right ascension difference between stationkeeping firings is preferably 180° and the stationkeeping thrusts are directed through the center of mass.

In order to generate positive and negative values of normal, tangential and radial velocity changes, a set of stationkeeping thrusters is preferably generated with a diagonal pair of thrusters. Accordingly, the thruster system 30 of FIG. 3A is partitioned into diagonally-arranged thruster pairs. In particular, the thrusters are partitioned into a first thruster pair 100 (consisting of thrusters 62 and 68) and a second thruster pair 102 Thus, each of the first and second thruster pairs has a north thruster (thrusters 62 and 64) and a south thruster (thrusters 66 and 68). Either of the diagonally-arranged thruster pairs 100 and 102 is suited for generating stationkeeping velocity changes in the satellite 20.

To apply torques to the satellite 20 for momentum unloading, each of the thrusters can be redirected to form a moment arm (e.g., the moment arm 84 in FIG. 3A) with the satellite's center of mass 82. Although the moment arm insures that torques will be generated, the thrusters will also contribute stationkeeping velocity changes in the satellite.

Each of the north thrusters 62 and 64 and its generated force is generally angled downward so that, in accordance with the cross product of T=R×F, torques generated by these thrusters in the region of right ascension 90° would be parallel to a torque plane 104 shown in FIG. 4. Similarly, each of the south thrusters 66 and 68 and its generated force is generally angled upward so that torques generated by these thrusters in the region of right ascension 270° would generally be parallel to a torque plane 106 that is substantially parallel to the torque plane 104. These torques would facilitate momentum dumping when momentum vectors are coplanar with the torque planes 104 and 106 but would be much less effective for nonplanar momentum vectors. Firings at these two locations, therefore, provide a spatial torque authority which may not be sufficient to accomplish momentum dumping in the satellite 20.

The spatial torque authority increases as the torque planes 104 and 106 are moved toward an orthogonal relationship, e.g., when torque plane 106 is at the broken-line position 106A near right ascension 180°. In accordance with the present invention, therefore, a nominal value for the momentum-dumping right ascension difference between momentum-dumping firings is preferably 90°.

Figure 5:
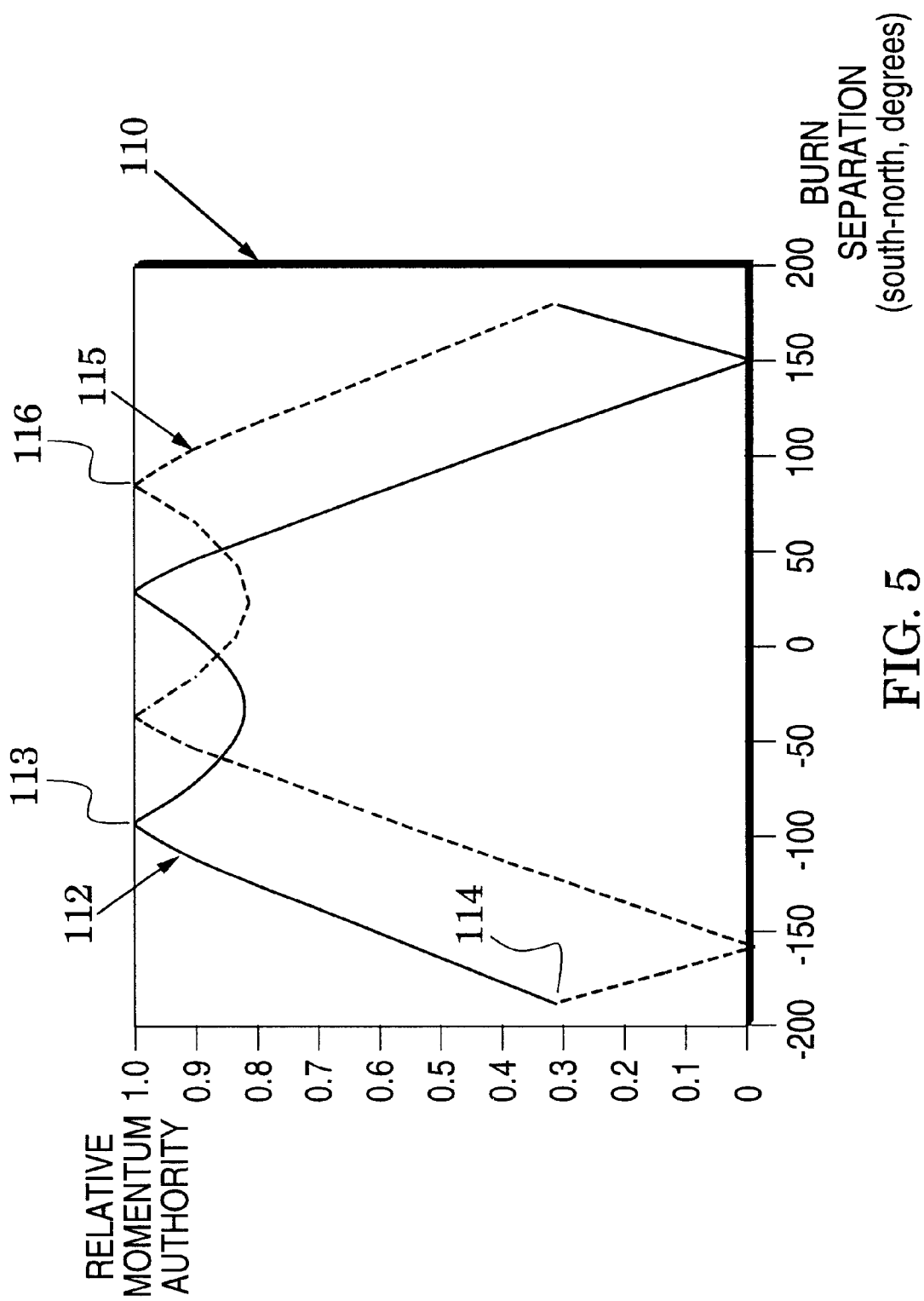
FIG. 5 is a graph of momentum authority as a function of right ascension difference between firings of a thruster pair in the thruster system of FIG. 3A.

The relationships between the momentum-dumping right ascension difference and the momentum authority achieved with that difference have been quantized by an analysis which is plotted in the graph 110 of FIG. 5. The plot 112 of graph 110 is directed to the first thruster pair (100 in FIG. 3A) and indicates that momentum authority (the result of torque authority) is at a maximum at a plot point 113 when the momentum-dumping right ascension difference has an absolute value on the order of 90° (south thruster−north thruster~−90°).

In an exemplary firing method of the invention, the first thruster pair 100 is dedicated to generation of momentum-dumping torques. In order to conserve thruster fuel, the south thruster 68 is preferably fired near right ascension 270° so that it also contributes to inclination control. In this case, the north thruster 62 would be fired 90° later in the region of right ascension 0°. As the firing point of the north thruster 62 is moved towards right ascension 90°, the thrust of this thruster increasingly aids in inclination control and, therefore, increases fuel efficiency.

However, as indicated in FIG. 4, momentum authority decreases as the momentum-dumping right ascension difference approaches −180°. Thus, movement on the plot 112 from the plot point 113 towards the plot point 114 causes an increase in fuel efficiency but a loss of momentum authority. The plot 115 of graph 110 is directed to the second thruster pair 102 and again indicates that momentum authority is at a maximum at a plot point 116 when the momentum-dumping right ascension difference has an absolute value on the order of 90° (south thruster−north thruster~+90°). Operation in the region of the plot points 113 and 116 strikes a reasonable compromise between momentum authority and fuel consumption. Operation is not desirable at the other peak values of the graph plots 112 and 115 because those points represent lower fuel efficiency. It is noted that the saddle regions between the peak values of plots 112 and 115 remain rather high in relative momentum authority (e.g., $\geq 0.8$) even though they include regions in which the momentum-dumping right ascension difference is zero. Significant momentum authority remains in these latter regions because the thrusters of each of the first and second thruster pairs (100 and 102 in FIG. 3A) are angled away from each other by the cant angle θ and slew angle α of FIGS. 3B and 3C.

In accordance with the present invention, therefore, 1) a stationkeeping right ascension difference between stationkeeping firings is preferably on the order of 180° and the stationkeeping thrusts are directed through the center of mass, 2) a momentum-dumping right ascension difference between momentum-dumping firings is preferably on the order of 90° and the thrusts are directed to define moment arms with the center of mass and 3) one of the momentum-dumping firings is preferably in the region of an appropriate one of the stationkeeping firings to further enhance fuel efficiency.

Although the teachings of the invention have been described with reference to a thruster system (30 in FIG. 3A)

positioned on a satellite's antinadir face (61 in FIG. 3A), these teachings are substantially unchanged when practiced with the thruster system positioned on the satellite's nadir face (the broken-line face 118 in FIG. 3A).

Figure 6:
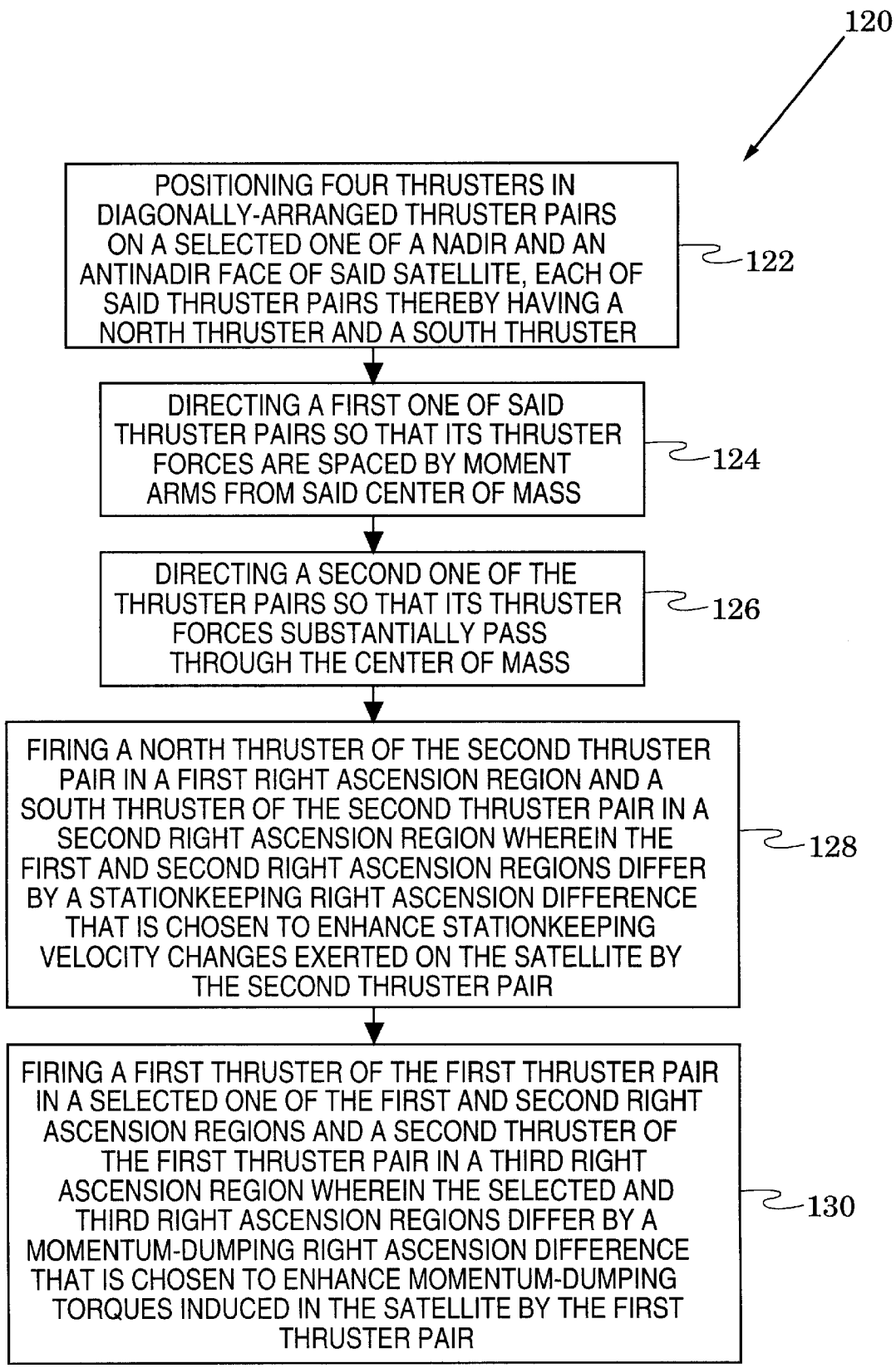
FIG. 6 is a flow chart which illustrates stationkeeping and momentum-dumping methods of the present invention.

A method which follows the teachings of the invention is recited in the flow chart 120 of FIG. 6. In a first process step 122, four thrusters are positioned in diagonally-arranged thruster pairs on a selected one of a satellite's nadir and an antinadir face so that each thruster pair has a north thruster and a south thruster. A first one of the thruster pairs is directed in step 124 so that its thruster forces are spaced by moment arms from the center of mass. A second one of the thruster pairs is directed in step 126 so that its thruster forces substantially pass through the center of mass.

In step 128, a north thruster of the second thruster pair is fired in a first right ascension region and a south thruster of the second thruster pair in a second right ascension region. The first and second right ascension regions differ by a stationkeeping right ascension difference that is chosen to enhance stationkeeping velocity changes.

A first thruster of the first thruster pair is fired in step 130 in a selected one of the first and second right ascension regions. A second thruster of the first thruster pair is fired in a third right ascension region. Finally, the selected and third right ascension regions differ by a momentum-dumping right ascension difference that is chosen to enhance momentum-dumping torques.

Figure 7B:
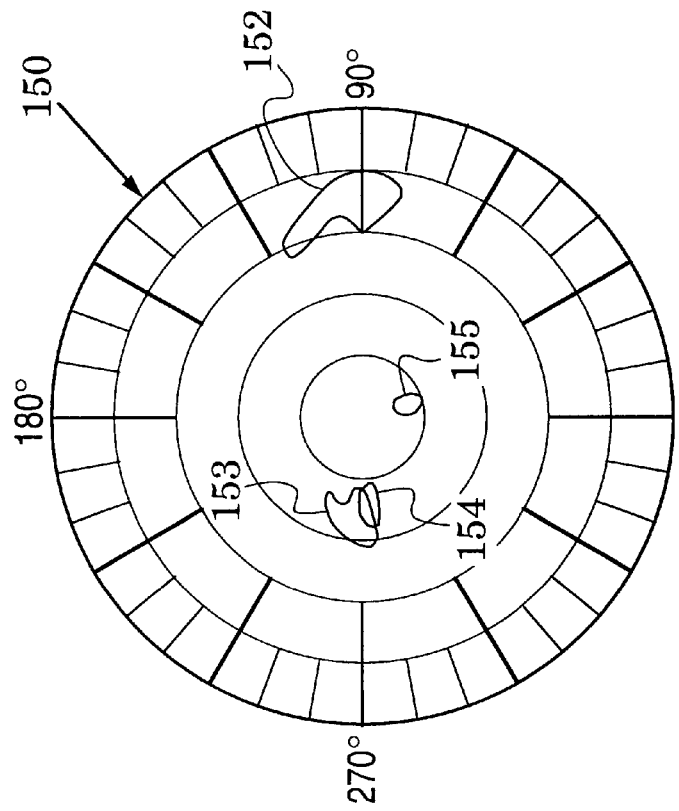
FIGS. 7A and 7B illustrate exemplary firing regions of the thruster system of FIG. 3A.
Figure 7A:
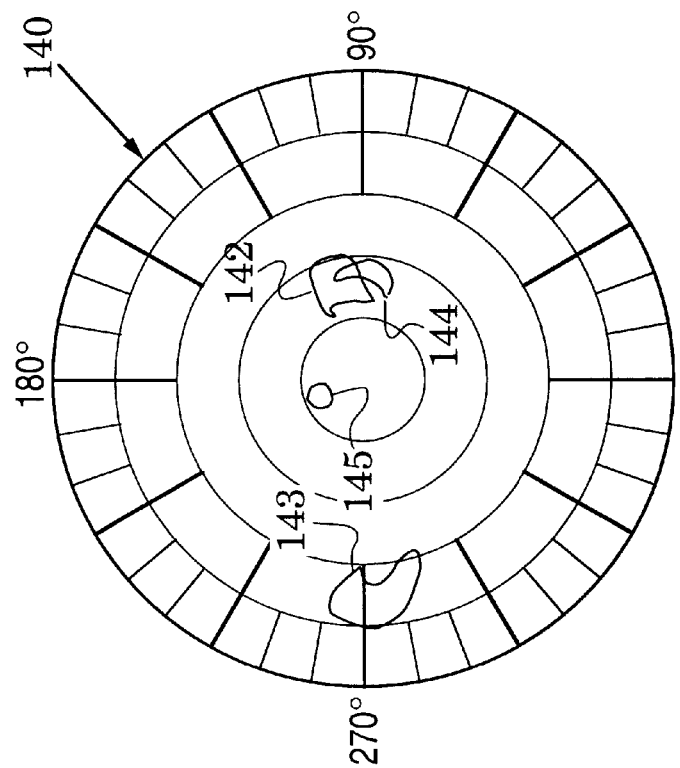

In accordance with the flow chart 120 of FIG. 6, an exemplary set of first, second, selected and third right ascension regions and respective velocity changes have been computed and are shown in the graphs 140 and 150 of FIGS. 7A and 7B.

Because of effect of solar pressure on orbit eccentricity, the graph 140 is especially suitable for the fall portion of the year (from summer solstice to winter solstice) and the graph 150 is especially suitable for the spring portion of the year (from winter solstice to summer solstice). Right ascension increases counterclockwise as shown in degrees at the perimeter of the graphs while radial distance represents the magnitude of velocity changes. The graphs summarizes a large number of calculated thruster firings by grouping them into the indicated regions.

In graph 140, the thruster pair 100 (thrusters 62 and 68) of FIG. 3A has been selected to be the second thruster pair of the flow chart 120 of FIG. 6 (i.e., these thrusters are directed so that their thruster forces substantially pass through the satellite's center of mass). The thruster pair 102 (thrusters 64 and 66) has been selected to be the first thruster pair of the flow chart 120 of FIG. 6 (i.e., these thrusters are directed so that their thruster forces are spaced by moment arms from the center of mass).

The north thruster of the stationkeeping thruster pair 100 is fired in a first right ascension region 142 (between ~90° and ~120°) and the south thruster is fired in a second right ascension region 143 (between ~260° and ~300°) so that the stationkeeping right ascension difference averages at ~170°). The north thruster of the momentum-dumping thruster pair 102 is fired in a selected right ascension region 144 (between ~85° and ~100°) that is substantially the first right ascension region. The south thruster of the momentum-dumping thruster pair 102 is fired in a third right ascension region 145 (between ~180° and ~210°) so that the momentum-dumping right ascension difference averages at ~105°). In general, the stationkeeping right ascension difference varies from ~140° to ~200° and the momentum-dumping right ascension difference varies from ~75° to ~135°.

In graph 150, the thruster pair 102 (thrusters 64 and 66) of FIG. 3A has been selected to be the second thruster pair of the flow chart 120 of FIG. 6 (i.e., these thrusters are directed so that their thruster forces substantially pass through the satellite's center of mass). The thruster pair 100 (thrusters 62 and 68) has been selected to be the first thruster pair of the flow chart 120 of FIG. 6 (i.e., these thrusters are directed so that their thruster forces are spaced by moment arms from the center of mass).

The north thruster of the stationkeeping thruster pair 102 is fired in a first right ascension region 152 (between ~80° and ~110°) and the south thruster is fired in a second right ascension region 153 (between ~260° and ~290°) so that the stationkeeping right ascension difference averages at ~190°). The south thruster of the momentum-dumping thruster pair 100 is fired in a selected right ascension region 154 (between ~290° and ~300°) that is substantially the second right ascension region. The north thruster of the momentum-dumping thruster pair 102 is fired in a third right ascension region 155 (between ~0° and ~30°) so that the momentum-dumping right ascension difference averages at ~85°). In general, the stationkeeping right ascension difference varies from ~160° to ~220° and the momentum-dumping right ascension difference varies from ~55° to ~115°.

Graphs 140 and 150 indicate that, in practice, the nominal values of 180° and 90° respectively for the stationkeeping right ascension difference and the momentum-dumping right ascension difference should be expanded to 180±30° and 90±30°. The graphs further indicate a range for the first right ascension region of right ascension 90±30°.

Graphs 140 and 150 also indicate that the third right ascension region is preferably delayed in right ascension (i.e., delayed in time) from the selected right ascension region (i.e., the third right ascension region lags the selected right ascension region). This corresponds to operation at plot points 113 and 116 of FIG. 5 which were previously shown to enhance fuel efficiency.

In addition to the operational methods outlined in the flow chart 120 of FIG. 6, the methods of the invention include failure-mode methods of stationkeeping and momentum dumping. If a thruster fails, its pair partner is not used further but, rather, the remaining functional thruster pair is employed.

Figure 8B:
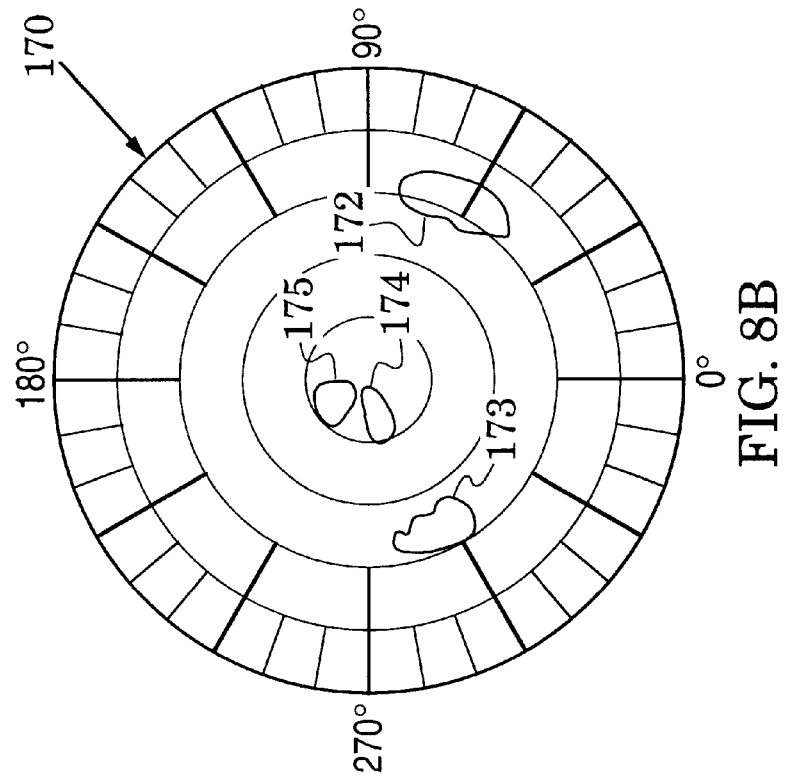
FIGS. 8A and 8B illustrate exemplary failure-mode firing regions of the thruster system of FIG. 3A.
Figure 8A:
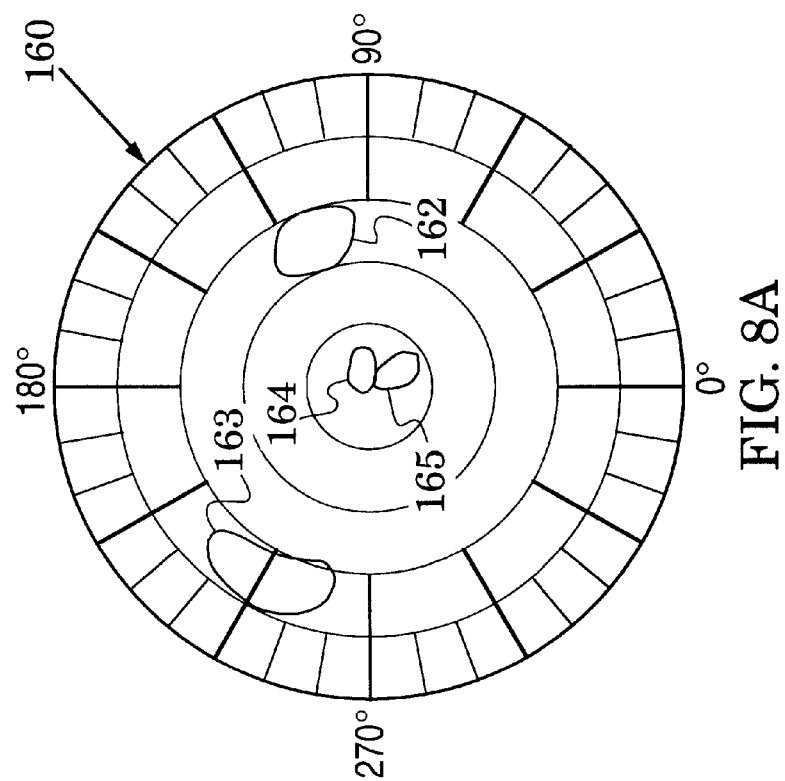

Exemplary failure-mode operations are shown in graphs 160 and 170 of FIGS. 8A and 8B. The failure-mode firings of graphs 160 and 170 have been computed respectively for the seasons of graphs 140 and 150.

In graph 160, the functional thruster pair is assumed to be the thruster pair 100 (thrusters 62 and 68) of FIG. 3A. In the following two firings, the north and south thrusters of the functional thruster pair 100 are directed so that their forces pass through the satellite's center of mass. The north thruster 62 is fired in a first right ascension region 162 (between ~90° and ~130°) and the south thruster 68 is fired in a second right ascension region 163 (between ~220° and ~265°) so that the stationkeeping right ascension difference averages at ~125°).

In the remaining two firings, the north and south thrusters of the functional thruster pair 100 are directed so that their forces define a moment arm with the satellite's center of mass. The north thruster 62 is fired in a selected right ascension region 164 (between ~80° and ~120°) that is substantially the first right ascension region. The south thruster 68 is fired in a third right ascension region 165 (between ~0° and ~40°) so that the momentum-dumping right ascension difference averages at ~80°). In general, the stationkeeping right ascension difference varies from ~95° to ~155° and the momentum-dumping right ascension difference varies from 650° to ~110°.

In graph 170, the functional thruster pair is assumed to be the thruster pair 102 (thrusters 64 and 66) of FIG. 3A. In the following two firings, the north and south thrusters of the functional thruster pair 102 are directed so that their forces pass through the satellite's center of mass. The north thruster 64 is fired in a first right ascension region 172 (between ~40° and ~80°) and the south thruster 66 is fired in a second right ascension region 173 (between ~280° and ~310°) so that the stationkeeping right ascension difference averages at ~125°).

In the remaining two firings, the north and south thrusters of the functional thruster pair 102 are directed so that their forces define a moment arm with the satellite's center of mass. The south thruster 66 is fired in a selected right ascension region 174 (between ~270° and ~300°) that is substantially the second right ascension region. The north thruster 64 is fired in a third right ascension region 175 (between ~180° and ~230°) so that the momentum-dumping right ascension difference averages at ~80°). In general, the stationkeeping right ascension difference varies from ~95° to ~155° and the momentum-dumping right ascension difference varies from ~50° to ~110°.

The firings of step 130 of the flow chart 120 of FIG. 6 generate the momentum-dumping torques of the invention and the firings of steps 128 and 130 both contribute to the stationkeeping velocity changes of the invention. Although it is not mandatory, it has been found that method computations are simplified by choosing velocity changes induced by each thruster of the first thruster pair so as to generate a net tangential velocity change in said satellite that is substantially zero. Thus, the momentum-dumping thrusters generate substantially zero east-west stationkeeping velocity changes. This simplification was used in the exemplary computations of FIGS. 7A, 7B, 8A and 8B.

Computations in accordance with the methods of the invention preferably choose the stationkeeping right ascension difference and the momentum-dumping right ascension difference independently. The four stationkeeping and momentum-dumping firing durations and firing locations are then determined along with gimbal angles (for gimbals 70 of FIGS. 3A–3C) required for momentum dumping. Various solutions exist as a function of the right ascension differences but minimum fuel solutions are preferably sought subject to the satisfaction of numerous stationkeeping and momentum-dumping firing constraints.

Firing Constraints

The stationkeeping and momentum-dumping methods of the invention that have been described above do not include the effects of firing exclusion zones that originate from constraints on thruster firing. Orbit and satellite configurations are typically the source of such firing constraints.

An exemplary firing constraint originates because of eclipses of the satellite which occur when the satellite and the sun are on opposite sides of the earth. In a geostationary orbit, for example, satellite eclipses occur daily during the autumn and spring equinox seasons. Because generation of electrical energy is greatly reduced at these times, thruster firing may be prohibited in or near the eclipse regions if the thruster is of a type (e.g., electrostatic) whose firing requires the expenditure of considerable electrical energy.

Another exemplary firing constraint may occur on satellites which have solar reflectors that are angled outward from the satellite's solar panels for enhancement of energy generation. Because the solar panels typically rotate throughout each day to keep their solar cells facing the sun, the solar reflectors may be rotated into a position where they could be damaged by the exhaust of the satellite's thrusters. Accordingly, each thruster may have daily exclusion zones in which it cannot be fired.

The exclusion zones imposed by firing constraints may require a widening of the right ascension regions in which the thrusters are fired. The firings of step 128 of the flow chart 120 of FIG. 6 typically use a larger portion of total fuel use than do the firings of step 130 (e.g., in a 75% to 25% ratio). To minimize degradation of fuel efficiency, it is preferred that the widening be principally accomplished with the firings of step 130.

On the other hand, the firings of step 130 must generate sufficient torque authority to accomplish momentum dumping. When a choice must be made, therefore, it has been found that it is preferable to degrade fuel efficiency in step 130 rather than degrade torque authority. In terms of plot 112 of the graph 110 of FIG. 5, it is preferable, therefore, to move further to the right of the plot point 113 rather than to move further to the left.

From these concepts, it has been determined that firing constraints typically require that the momentum-dumping right ascension difference be expanded from 90±30° to a range of 120° to 0° wherein the third right ascension region can either lag or lead (in right ascension) the selected right ascension region. It has been found that a more modest expansion of the stationkeeping right ascension difference (e.g., from 180±30° to 180±45°) and of the right ascension region (e.g., from right ascension 90±30° to right ascension 90±45°) is sufficient to accommodate typical firing constraints.

Stationkeeping and momentum dumping methods of the invention are applicable to a variety of satellite orbits (e.g., geostationary, synchronous and inclined orbits) and, as mentioned above, may be practiced with thrusters that are positioned on either the nadir or the antinadir face of a satellite's body. These teachings may also be practiced with various thruster types (e.g., monopropellant and bipropellant thrusters). Method efficiency can be enhanced with high specific impulse thrusters (e.g., ion thrusters) which can be fired daily at the locations exemplified in FIGS. 7A and 7B.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of stationkeeping and momentum dumping for an earth satellite wherein the satellite has a center of mass, the method comprising the steps of:

positioning four thrusters in diagonally-arranged thruster pairs on a selected one of a nadir and an antinadir face of the satellite, each of the thruster pairs thereby having a north thruster and a south thruster;

directing a first one of said thruster pairs so that its thruster forces are spaced by moment arms from said center of mass;

directing a second one of said thruster pairs so that its thruster forces substantially pass through said center of mass;

firing each of said first thruster pair to generate momentum-dumping torques in said satellite; and firing each of said second thruster pair to generate stationkeeping velocity changes in said satellite.

2. The method of claim 1, wherein said second-thruster-pair firing step includes the step of firing a north thruster of said second thruster pair in a first right ascension region and a south thruster of said second thruster pair in a second right ascension region wherein said first and second right ascension regions differ by a stationkeeping right ascension difference;

and wherein said first-thruster-pair firing step includes the step of firing a first thruster of said first thruster pair in a selected one of said first and second right ascension regions and a second thruster of said first thruster pair in a third right ascension region wherein said selected and third right ascension regions differ by a momentum-dumping right ascension difference.

3. The method of claim 2, wherein said stationkeeping right ascension difference is in a range of 180±30°.

4. The method of claim 3, wherein said first right ascension region is in a range of right ascension 90±30°.

5. The method of claim 2, wherein said momentum-dumping right ascension difference is in a range of 90±30°.

6. The method of claim 5, wherein said third right ascension region lags said selected right ascension region.

7. The method of claim 2, wherein:

said selected right ascension region is said first right ascension region; and said first thruster is a north thruster.

8. The method of claim 2, wherein:

said selected right ascension region is said second right ascension region; and said first thruster is a south thruster.

9. The method of claim 2, wherein said stationkeeping right ascension difference is in a range of 180±45°.

10. The method of claim 9, wherein said first right ascension region is in a range of right ascension 90±45°.

11. The method of claim 2, wherein said momentum-dumping right ascension difference is in a range of 0° to 120°.

12. The method of claim 11, wherein said third right ascension region lags said selected right ascension region.

13. The method of claim 11, wherein said third right ascension region leads said selected right ascension region.

14. The method of claim 1, wherein said selected face is said nadir face.

15. The method of claim 1, wherein said selected face is said antinadir face.

16. The method of claim 1, wherein said thrusters are electrostatic thrusters.

17. The method of claim 1, further including the step of choosing velocity changes induced by each thruster of said first thruster pair to generate a net tangential velocity change in said satellite that is substantially zero.

18. A method of stationkeeping and momentum dumping for an earth satellite wherein said satellite has a center of mass and two thrusters positioned in a diagonal relationship on a selected one of a nadir and an antinadir face of said satellite, the method comprising the steps of:

in first and second right ascension regions that differ by a stationkeeping right ascension difference:

a) directing a north thruster of said thrusters in said first right ascension region so that its thruster force substantially passes through said center of mass;

b) firing said north thruster in said first right ascension region;

c) directing a south thruster of said thrusters in said second right ascension region so that its thruster force substantially passes through said center of mass; and d) firing said south thruster in said second right ascension region; and in a selected one of said first and second right ascension regions and in a third right ascension region that differs from said selected right ascension region by a momentum-dumping right ascension difference:

a) directing a first thruster of said thrusters in said selected right ascension region so that its thruster force is spaced by a moment arm from said center of mass;

b) firing said first thruster in said selected right ascension region;

c) directing a second thruster of said thrusters in said third right ascension region so that its thruster force is spaced by a moment arm from said center of mass; and d) firing said second thruster in said third right ascension region.

19. The method of claim 18, wherein said momentum-dumping right ascension difference is in a region of 50° to 110°.

20. The method of claim 18, wherein:

said selected right ascension region is said first right ascension region; and said first thruster is a north thruster.

21. The method of claim 18, wherein said first right ascension region is in a region of right ascension 90° to right ascension 130° and said stationkeeping right ascension difference is in a region of 95° to 155°.

22. The method of claim 21, wherein said momentum-dumping right ascension difference is between 50° and 110°.

23. The method of claim 18, wherein:

said selected right ascension region is said second right ascension region; and said first thruster is a south thruster.

24. The method of claim 23, wherein said first right ascension region is in a region of right ascension 40° to right ascension 80° and said stationkeeping right ascension difference is between 95° and 155°.

25. The method of claim 24, wherein said momentum-dumping right ascension difference is between 50° and 110°.

26. The method of claim 18, further including the step of choosing velocity changes induced by said thrusters in said selected and third right ascension regions to generate a net tangential velocity change in said satellite that is substantially zero.

27. The method of claim 18, wherein said selected face is said nadir face.

28. The method of claim 18, wherein said selected face is said antinadir face.

* * * * *